April 4, 1967 R. D. KLUGE 3,311,945
MECHANICAL APPARATUS

Filed July 20, 1964 2 Sheets-Sheet 1

INVENTOR.
ROBERT D. KLUGE
BY
ATTORNEY.

April 4, 1967 R. D. KLUGE 3,311,945
MECHANICAL APPARATUS

Filed July 20, 1964 2 Sheets-Sheet 2

INVENTOR.
ROBERT D. KLUGE
BY
Arthur H. Swenson
ATTORNEY.

United States Patent Office 3,311,945
Patented Apr. 4, 1967

3,311,945
MECHANICAL APPARATUS
Robert D. Kluge, Westminster, Colo., assignor to Honeywell Inc., Minneapolis, Minn., a corporation of Delaware
Filed July 20, 1964, Ser. No. 383,613
5 Claims. (Cl. 16—179)

The present invention relates to drawer slides. More specifically, this invention relates to slides carrying hinge mounted devices.

An object of the present invention is to provide an improved integral slide and hinge apparatus.

Another object of the present invention is to provide an improved integral hinge and slide apparatus including automatic hinge and slide locking means.

A further object of the present invention is to provide an improved integral hinge and slide having a slide locking means to allow operation of the slide only in a predetermined position of the hinge.

A still further object of the present invention is to provide a hinge and slide apparatus with a hinge lock preventing operation of the hinge except in an extended position of the slide.

Another further object of the present invention is to provide an improved integral hinge and slide apparatus, as set forth herein, having a simple operation and construction.

In accomplishing these and other objects, there has been provided, in accordance with the present invention, an integral hinge and slide apparatus having an automatically operating lock means to prevent an undesired motion of either the slide or hinge. The lock means is arranged to introduce a locking pawl into a recess in a stationary part of the slide upon a relative motion of the movable part of the slide upon the stationary part. The withdrawal of the pawl from the recess is controlled by the position of the hinge carried by the movable part of the slide to permit movement of the movable part only upon the occurrence of a desired position of the hinge and a movement of the hinge only in an extended position of the slide.

A better understanding of the present invention may be had when the following detailed description is read in connection with the accompanying drawings, in which.

Figure 1:
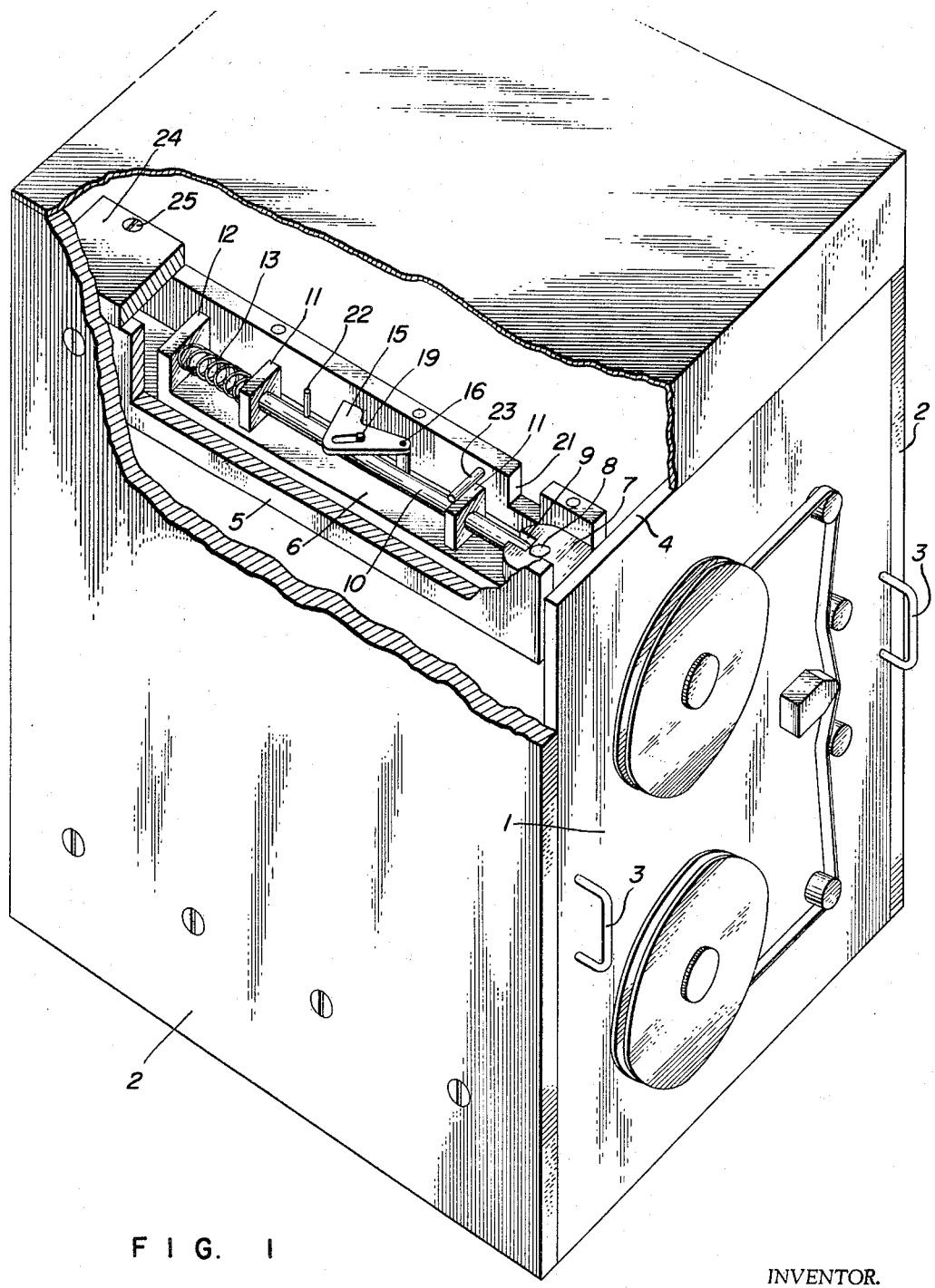
FIG. 1 is a pictorial representation of the hinge and slide apparatus of the present invention in an embodiment for supporting a rack mounted tape transport.
Figure 2:
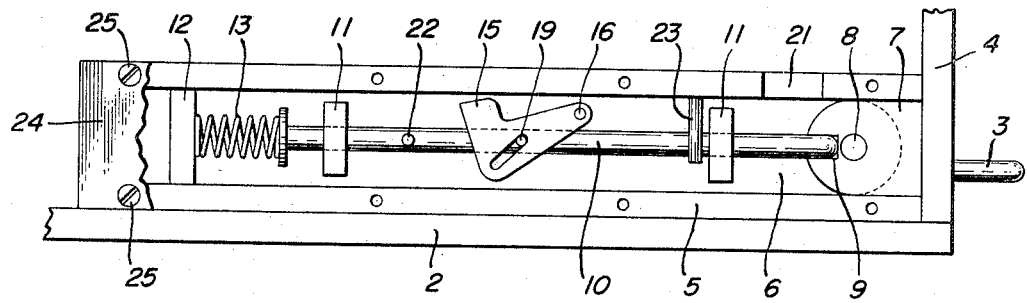
FIG. 2 is a pictorial representation of a top view of the hinge and slide of the present invention in a retracted state of the slide.
Figure 3:
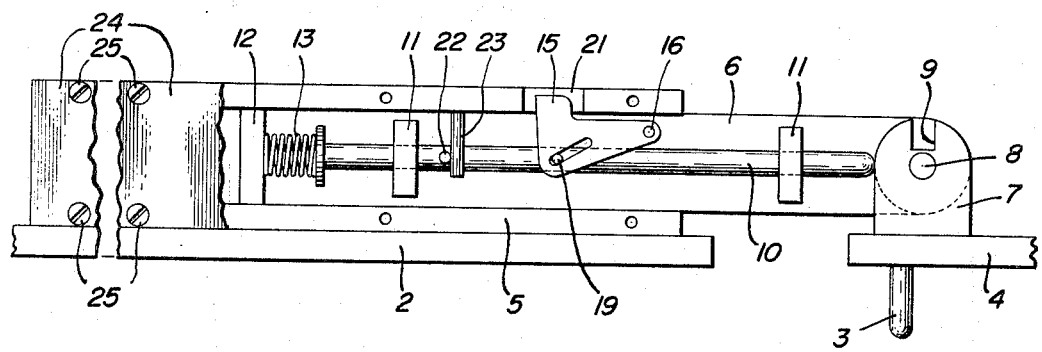
FIG. 3 is a top view of the hinge and slide apparatus shown in FIG. 2 in an extended state of the slide.

Referring to FIG. 1 in more detail, there is shown a tape transport 1 arranged to be slidable mounted on rack 2. The transport 1 is provided with a pair of handles 3 attached to the front of a transport support plate 4 to facilitate the withdrawal of the transport 1 from the rack 2. The transport 1 is supported on a pair of slides such as the slide shown which has a stationary frame 5 fastened to the rack 2. A movable bar 6 is fastened to the back of the support plate 4 by means of a hinge means 7. The hinge 7 has a hinge pin 8 and a slot 9 which slot is arranged at a substantially right angle with respect to the support plate 4.

A movable rod 10 is carried on the bar 6 by a pair of restraining guide means 11 fastened to the bar 6. The end of the bar 6 opposite to the hinge 7 is provided with a perpendicularly projecting abutment 12. A spring 13 is disposed between the abutment 12 and an end of the rod 10 to urge the other end of the rod 10 into the slot 9.

A locking pawl 15 is pivotally mounted on bar 6 by a hinge pin 16. The pawl 15 has an elongated hole 18 which cooperates with a first pin 19 carried by the rod 10, as hereinafter described. A recess 21 is provided in the frame 5 to accept an end of the pawl 15 in an extended position of the bar 6. A second pin 22 carried by the rod 10 is arranged to contact a stop bar 23 attached to the stationary frame 4 in the extended position of the bar 6. The stop bar 23 is spaced from the rod 10 and pawl 15 to permit the pawl 15 to pass thereunder. A cover plate 24 may be attached to the frame 5 by screws 25 to restrain the bar 6 within the frame 5.

In operation, the slide and hinge apparatus of the present invention is arranged to allow a movement of the transport 1 and support plate 4 out of the rack 2 but to permit a re-entry of the transport 1 into the rack 2 only when the transport 1 has been positioned in a suitable position; i.e., parallel to the front of the rack 2. This selective movement is achieved by means of the locking pawl 15 which is positioned in the recess by the withdrawal movement of the transport 1 from the rack 2. This withdrawal of the transport 1 carries the bar 6 and the rod 10 out of the frame 5 until the second pin 22 contacts the stop 23. The continued further motion of the bar 6 is effective to compress the spring 13 and to withdraw the end of the rod 10 from the slot 9 in the hinge 7. Additionally, the first pin 19 slides in the elongated hole 18 in the pawl 15 to rotate the pawl 15 about the pivot pin 16. This rotation is effective to introduce an outwardly extending portion of the pawl 15 into the recess 21.

If the extended transport 1 is not rotated about the hinge 7, a re-entry of the transport 1 into the rack 2 is accompanied by a reversal of the above actions. Thus, the pawl 15 is rotated out of the recess 21 by the first pin 19, as the second pin 22 is disengaged from the stop 23, to allow the spring 13 to restore the end of the rod 10 in the slot 9. Accordingly, the transport 1 may be slid back into the rack 2 on the bar 6 and slide frame 5.

However, if the transport 1 has been rotated on the hinge 7 and is urged back into the rack 2 in this state, the end of the rod 10 cannot enter the slot 9. This position of the rod 10 is effective to maintain the pin 22 against the stop 23 and the locking pawl 15 in the recess 21. Thus, the transport 1 and bar 6 may be moved back only until the pawl 15 contacts the side of the recess 21 and prevents any further motion of the transport 1 into the rack 2. A subsequent rotation of the transport 1 on hinge 7 will allow the rod 10 to enter the slot 9 and withdraw the pawl 15 from the recess 21, as described above, to permit a complete re-entry of the transport 1 into the rack 2. It is to be noted that the locking slide and hinge of the present invention may be used for only one of the supporting slides of the transport 1 and may, also, be utilized in other positions to control related motions. For example, the locking slide and hinge may be used at the bottom of a withdrawn vertical element which is rotated into a horizontal position to prevent re-entry until the element is restored to a vertical position.

Accordingly, it may be seen that there has been presented in accordance with the present invention, an integral slide and hinge having a locking means to selectively prevent an undesired motion of a device rotatably supported on the hinge and provide with linear motion by the slide.

What is claimed is:
1. A lock for an integral hinge and slide comprising slide means operative to provide linear motion for an apparatus mounted thereon, hinge means mounted on said slide means and arranged to provide rotation of said apparatus carried by said slide means, slidable rod means mounted on said slide means, said slidable rod means arranged in normal engagement with said hinge means for preventing rotation thereof, and stop means operative to disengage said slidable rod means from said hinge means for allowing rotation of said hinge means only when said slide means and said hinge means are in a predetermined spatial relationship.

2. A lock for an integral hinge and slide as set forth in claim 1 wherein said slidable rod means includes a locking pawl means actuated by the linear motion of said slidable rod means, as said rod means disengages from said hinge means, to prevent further linear motion of said slide means while said hinge means is being rotated.

3. An integral hinge and slide comprising a slide having a stationary frame and a movable load carrying slide supported by said frame, slotted hinge means mounted on said movable slide and arranged to allow rotation of a load carried by said movable load carrying slide, slidable rod means mounted on said movable slide, said slidable rod means arranged for normally engaging said slot within said hinge means thereby locking said hinge means to prevent an undesired rotational motion thereof, and stop means mounted upon said frame and operative to unlock said slidable rod means from said slot within said hinge means for allowing a rotational motion of said hinge means when said movable slide is extended from said frame.

4. An integral hinge and slide as set forth in claim 3 wherein said slidable rod means includes a locking pawl means actuated by the motion of said slidable rod means, as said rod means unlocks from said slot within said hinge means, and said stationary frame includes a portion having a recess therein for receiving said locking pawl means for thereby preventing further motion of said movable load carrying slide while said hinge means is being rotated.

5. A lock for an integral slide and hinge comprising a slide having a stationary member and a movable member slidable mounted on said stationary member, a hinge means mounted on one end of said movable member to connect a load to be carried to said movable member and to afford selective rotation of said load on said hinge means, said hinge means including a slot therein, a hinge locking rod slidable mounted on said movable element, a spring means arranged to urge the end of said rod into said slot in said hinge means to prevent rotation of said hinge means, a slide locking pawl pivotally mounted on said movable element, a first pin mounted on said rod and arranged to deflect said pawl upon relative motion between said rod and said movable element, said stationary element having a recess to receive said pawl upon said deflection by said first pin, a second pin carried by said rod and stop means mounted on said stationary element to intercept said second pin in a predetermined position of said rod to allow a relative motion between said rod and said movable element to pivot said pawl and withdraw said rod from said slot in said hinge.

References Cited by the Examiner

UNITED STATES PATENTS 2,487,745 11/1949 Witmer _____ 16—190
2,489,486 11/1949 Glynn _____ 16—179
2,579,091 12/1951 Rinaldo _____ 16—190

EDWARD C. ALLEN, *Primary Examiner.*

D. L. TROUTMAN, *Assistant Examiner.*